Patented Jan. 16, 1934

1,943,467

UNITED STATES PATENT OFFICE 1,943,467

PHARMACEUTICAL PREPARATION

Rudolph S. Bley, Washington, D. C.

No Drawing. Application February 8, 1932
Serial No. 591,755

18 Claims. (Cl. 167—93)

This invention relates to an improved antiseptic dentifrice. I am well aware that numerous antiseptics have been already incorporated into dentifrices as a means to check pyorrhœa alveolaris, a dental disease of bacterial origin. However all these well-known antiseptics are highly poisonous to animal tissue especially to the tender mucous membranes, and it is for this reason that all of these antiseptics can be used only in very small percentages in dentifrices, thus decreasing greatly their germicidal value. The phenol coefficient of most of the well-known dentifrices is therefore extremely low.

The primary object of the present invention is to incorporate into dentifrices antiseptics of such type which are non-poisonous to human beings even when swallowed in small quantities.

Another object of the present invention is to incorporate into dentifrices a highly concentrated antiseptic or a mixture of highly concentrated antiseptics without having any harmful effect upon human teeth and their surrounding tissues.

A further object of this invention is to incorporate into dentifrices such antiseptics which are characterized by a low surface tension, thus increasing the property of penetration of said antiseptics into the cavities of teeth and tissues to which such dentifrices are applied. Antiseptics of low surface tension penetrate readily small crevices and spaces which may harbour microorganisms and moreover they diffuse into bacterial cells more readily, thus more rapidly destroying the same. Under equivalent conditions the efficiency of a germicide is increased the more its surface tension is reduced. Dentifrices having incorporated therein compounds of low surface tension are characterized by a better wetting property which promotes the cleansing action of such dentifrices.

I have discovered that reaction products of aliphatic and aromatic acids with monohydric, dihydric and trihydric phenols exert a powerful germicidal action and that they are harmless to animal tissue even in concentrated form. When swallowed in small quantities by human beings they are non-poisonous, but on the contrary some of these compounds, especially n-hexyl-m-dihydroxy-benzene, have a beneficial effect upon the urinary organs when the same are infected by bacilli of the Coli group.

I prefer to use such reaction products as ingredients in dentifrices which have a low surface tension in order to increase the germicidal coefficient of such dentifrices. However I wish to state that satisfactory results may also be obtained with reaction compounds which do not have a very low surface tension. Even such compounds exert a more powerful germicidal effect than those used up to date in dentifrices.

In my copending applications I have claimed a process of producing reaction products of aliphatic and aromatic acids with monohydric, dihydric and trihydric phenols.

By condensng carboxylic or fatty acids of the type $C_nH_{2n+1}.(COOH)x$ with monohydric, dihydric or trihydric phenols in presence of condensing agents such as zinc chloride and reducing the intermediate reaction product with zinc amalgam, powerful antiseptics of the following structure are evidently obtained.

$$R.C_nH_{2n+1}$$

wherein R represents a hydroxybenzene. The $C_nH_{2n+1}$ radical may be evidently linked to the benzol nucleus in the ortho, meta or para position.

By condensing for example caproic acid with m-diphydroxybenzene and reducing the 1,3-dioxyphenyl-1,4-alkylketones, n-hexyl-2,4-dihydroxybenzene is finally obtained. The purified, crystalline reaction product is soluble in water, alcohol or ether. It has a specific gravity of about 1.282, a melting point of about 116° C. and a boiling point of about 276° C. Its phenol coefficient is 45–55 and its surface tension in aqueous solution 35–40 dynes per centimeter. By condensing other fatty acids with m-dihydroxybenzene and reducing the intermediates, a series of final reaction compounds may be obtained for example:

C-propionyl-m-dihydroxybenzene.
C-butyl-m-dihydroxybenzene.
C-heptyl-m-dihydroxybenzene.
C-octyl-m-dihydroxybenzene.
C-dodecyl-m-dihydroxybenzene.
C-isobutyl-m-dihydroxybenzene.
C-isoamyl-m-dihydroxybenzene.
C-isohexyl-m-dihydroxybenzene, etc.

Instead of m-dihydroxybenzene, o-dihydroxybenzene or p-dihydroxybenzene may be used to produce ortho and para compounds respectively. Such reactions may also be carried out with hydroxybenzenes or trihydroxybenzenes.

Instead of reacting aliphatic acids with hydroxybenzenes and reducing the intermediates, aromatic acids may be reacted upon in a similar manner.

I have moreover found that especially heterocyclic compounds of the furane group yield reaction products with hydroxybenzenes which are splendid antiseptics for dentifrices.

By condensing for example furoic acid or pyromucic acid with hydroxybenzenes and reducing the intermediate products, preferably in "statu nascendi", final reaction products having high phenol coefficients are obtained.

Two isomers are evidently obtainable having probably the following structures:
(1) alpha-furfurylhydroxybenzenes:

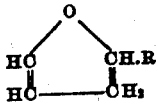

wherein R represents a hydroxybenzene.
(2) beta-furfurylhyroxybenzenes:

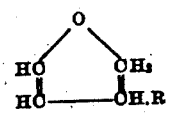

wherein R represents also a hydroxybenzene.

Evidently the furane nucleus may be linked to the benzol nucleus in the ortho, meta or para position.

A further object of my invention is to incorporate my antiseptics together with enzymes, for example diastase, into dentifrices. I am aware that it has been already proposed to use enzymes, for example pepsin, in dentifrices. Enzymes have also been combined with certain antiseptics, such as thymol, alcohol, phenol, etc., without decreasing their activity considerably. However all these antiseptics must be used in very dilute form, otherwise enzymic action is inhibited.

I have found that antiseptics produced by reacting aliphatic or aromatic acids upon hydroxybenzenes and reducing the intermediates in the described manner do not inhibit enzymic action even when added to enzymes in concentrated form.

N-hexyl-m-dihydroxybenzene for example in 50% aqueous solution does not decrease the enzymic action of diastase upon carbohydrates, such as starches. By incorporating, for example, diastase in its natural or isolated form together with n-hexyl-m-dihydroxybenzene into a dentifrice, a splendid commercial product is obtained. The antiseptic ingredient instantaneously kills pathogenic microorganisms without affecting the tissue, its germicidal action being greatly supported by its low surface tension. The diastatic ingredient, on the other hand, rapidly hydrolizes starchy food particles clinging to crevices and cavities of teeth or their surrounding tissues. By this hydrolysis soluble and digestible sugars are obtained. Such a dentifrice has not only high germicidal, but also therapeutical properties.

My antiseptics may be used in combination with neutral, alkaline, acid or foaming dentifrices.

I wish to point out that I am not limited to specific tooth paste combinations, but my antiseptics may be added to any known commercial tooth paste composition. They may be combined also with dry tooth powders or antiseptic chewing gums.

As a base for tooth powders or tooth pastes I may use: precipitated chalk, amorphous prepared chalk, calcium phosphate, kieselguhr, clay, kaolin, magnesium carbonate, pumice, cattle fish bone, strontium oxide, soap, catechu, tin oxide, barium sulphate, camphorated chalk, charcoal, zinc oxide, zinc carbonate, etc.... In other words, I may use any inorganic or organic base known in the tooth paste art.

Other modifying and flavoring compounds may be incorporated, such as cream of tartar, sodium bicarbonate, borax, saccharine, sodium chloride, boric acid, milk sugar, glucose, higher sugars, starches, saponins, quinine, quinine derivatives, glucosides, peppermint oil, peppermint oil substitutes, clove oil, eucalyptol, terpenyl acetate, cassia oil, cinnamon oil, thyme oil, nutmeg oil, anethol, camphor, eugenol, phenethyl alcohol, Caraway oil, orris root powder, alcohols, bergamot oil, rose-geranium oil, neroli oil, citronellol, benzaldehyde, albumins, myrrh powder, menthol, methyl, salicylate, thymol, geraniol, lavender oil, lemon oil, citral, eosine, salol, phloxine, magenta crystas, erythrosine, sodium benzoate, carmine, saffron, glycerine, glycerine of starch, glycerine substitutes, honey, syrup, molasses, laevulose, gums, vitamins, irradiated vitamins, radioactive substances, enzymes, ferments, buffer salts, etc....

About 2-100% of the finely ground antiseptic is added to the dentifrices as follows. The addition of enzymes may vary between ¼-5 per thousand; though more of the same may be incorporated at will.

*Example 1: Acid tooth powder*

| | |
|---|---|
| Cream of tartar | 400 grams |
| Kieselguhr | 600 grams |
| Erythrosine | 0.5 grams |
| Oil of peppermint | 10 cc. |
| Citral | 1.5 cc. |
| Antiseptic | 2-100 per thousand of the total mix |

*Example 2: Alkaline toothpowder*

| | |
|---|---|
| Sodium bicarbonate | 50 grams |
| Borax | 50 grams |
| Magnesium carbonate | 400 grams |
| Precipitated chalk | 500 grams |
| Eucalyptol | 5 cc |
| Terpenyl acetate | 5 cc. |
| Soluble saccharine | 1 g. |
| Antiseptic | as in Example 1 |

*Example 3: Antacid toothpowder*

| | |
|---|---|
| Precipitated chalk | 700 grams |
| Magnesium carbonate | 225 grams |
| Borax | 75 grams |
| Eosine | 1 g. |
| Cassia oil | 8 cc. |
| Rose oil | 2 cc. |
| Antiseptic | as in Example 1 |
| Diastase at will; preferably ¼-5 per thousand | |

*Example 4: Saponaceous toothpowder*

| | |
|---|---|
| Powdered castile soap | 200 grams |
| Chalk precipitated | 400 grams |
| Magnesium carbonate | 400 grams |
| Gluside (500) | 1 g. |
| Peppermint oil | 1 cc. |
| Lemon oil | 9 cc. |
| Antiseptic as in Example 1 or antiseptic plus diastase as in Example 3 | |

*Example 5: White toothpaste*

| | |
|---|---|
| Precipitated chalk | 500 grams |
| Tricalcium orthophosphate | 400 grams |
| Soluble saccharine | 0.5 g. |
| Soap powder | 100 g. |
| Tragacanth | 1 g. |
| Peppermint oil | 5 g. |
| Spearmint oil | 1 g. |
| Methyl salicylate | 2 g. |
| Clarified honey, water and glycerine to produce proper consistency | |
| Antiseptic or antiseptic plus enzyme as in Examples 1 and 3 | |

Example 6: Pink toothpaste

Add to composition, Example 5, proper amount of erythrosine or the like

I wish to point out that the above examples are merely illustrative, and I do not wish to be limited to the exact proportions set forth above, which are typical combinations, as certain of these ingredients may be omitted or replaced by others of similar nature, and the proportions within limits may be varied. In other words, while I have found that the ingredients and proportions above mentioned give the desired results, I do not wish to be limited to the use of all of these ingredients, to these ingredients and no others, nor to the exact proportions and concentrations set forth above, as the omission of some ingredients or a slight variation of proportions will not adversely affect the final dentifrice, although it may vary somewhat the relative characteristics of such dentifrice, resulting from such variations. Moreover I wish to point out that I may combine one or more different types of my antiseptics in one dentifrice, with other words I may combine, for example the hexyl-m-dihydroxybenzene with the furfuryl-m-dihydroxybenzene etc. . . ., to obtain the desired germicidal action.

What I claim and desire to secure by Letters Patent is:

1. An antiseptic dentifrice, which does not deleteriously affect animal tissue comprising final reaction products of organic acids with hydroxybenzenes and an enzyme in active state.

2. An antiseptic dentifrice which does not deleteriously affect animal tissue comprising a final reaction product of an aliphatic acid with a hydroxybenzene, having probably the structure $R.C_nH_{2n+1}$, wherein R represents a hydroxybenzene and an enzyme in active state.

3. An antiseptic dentifrice which does not deleteriously affect animal tissue comprising a final reaction product of an aromatic acid with a hydroxybenzene, having probably the structure $R.R_1$, wherein R represents a hydroxybenzene, $R_1$ a phenyl radical, and an enzyme in active state.

4. An antiseptic dentifrice which does not deleteriously affect animal tissue comprising a final reaction product of a furane derivative with a hydroxybenzene and an enzyme in active state.

5. An antiseptic dentifrice which does not deleteriously affect animal tissue comprising n-hexyl-m-dihydroxybenzene and an enzyme in active state.

6. An antiseptic dentifrice which does not deleteriously affect animal tissue comprising a furfuryl-m-hydroxybenzene and an enzyme in active state.

7. A dentifrice comprising n-hexyl-m-dihydroxybenzene and active diastase.

8. A composition of matter comprising a concentrated solution of an antiseptic and an enzyme in active state suspended therein, said antiseptic having the structure $R.C_nH_{2n+1}$, wherein R represents a hydroxybenzene.

9. A composition of matter comprising a concentrated solution of a furfuryl-hydroxybenzene which acts as a disinfectant and an enzyme in active state dispersed therein.

10. The method of preserving the activity of enzyme suspensions which comprises adding thereto final reaction products, which are not deleterious to animal tissue, of an aliphatic acid with a hydroxybenzene having probably the structure $R.C_nH_{2n+1}$, wherein R represents a hydroxybenzene.

11. The method of preserving the activity of enzyme suspensions which comprises adding thereto final reaction products of an aromatic acid with a hydroxybenzene having probably the structure $R.R_1$, wherein $R_1$ represents a phenyl-radical and R a hydroxybenzene.

12. The method of preserving the activity of enzyme suspensions which comprises adding thereto final reaction products of a furane derivative with a hydroxybenzene.

13. The method of preserving the activity of diastase suspensions which comprises adding thereto hexyl resorcinol.

14. The method of preserving the activity of enzyme suspensions which comprises adding thereto hexyl resorcinol.

15. The method of preserving the activity of enzyme suspensions which comprises adding thereto a furfuryl-m-hydroxybenzene.

16. The method of preserving the activity of diastase which comprises adding thereto furfuryl-m-dihydroxybenzene.

17. A composition of matter comprising an alkylresorcinol which acts as an antiseptic and an enzyme in active state dispersed therein.

18. A composition of matter comprising an alkylresorcinol and active diastase.

RUDOLPH S. BLEY.